United States Patent
Gaal et al.

(10) Patent No.: US 12,192,994 B2
(45) Date of Patent: Jan. 7, 2025

(54) COLLISION HANDLING FOR COMPONENT CARRIER SWITCHING

(71) Applicant: QUALCOMM Incorporated, San Diego, CA (US)

(72) Inventors: Peter Gaal, San Diego, CA (US); Yiqing Cao, Beijing (CN); Chenxi Hao, Beijing (CN); Yi Huang, San Diego, CA (US); Bo Chen, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 337 days.

(21) Appl. No.: 17/755,575

(22) PCT Filed: Feb. 11, 2020

(86) PCT No.: PCT/CN2020/074706
§ 371 (c)(1),
(2) Date: May 2, 2022

(87) PCT Pub. No.: WO2021/098046
PCT Pub. Date: May 27, 2021

(65) Prior Publication Data
US 2022/0386335 A1 Dec. 1, 2022

Related U.S. Application Data

(60) Provisional application No. 62/938,797, filed on Nov. 21, 2019.

(51) Int. Cl.
*H04W 72/1268* (2023.01)
*H04W 72/23* (2023.01)
(Continued)

(52) U.S. Cl.
CPC ....... *H04W 72/1268* (2013.01); *H04W 72/23* (2023.01); *H04W 72/569* (2023.01); *H04W 74/0825* (2013.01)

(58) Field of Classification Search
CPC ............. H04W 74/0825; H04W 72/23; H04W 72/569; H04W 72/1268
(Continued)

(56) References Cited

U.S. PATENT DOCUMENTS 10,211,955 B2    2/2019   Chen et al.
2010/0110988 A1*  5/2010   Marinier ................... H04L 1/04
                                                              370/328

(Continued)

FOREIGN PATENT DOCUMENTS

CN     107734688 A    2/2018
CN     109644093 A    4/2019
WO     WO-2018144728  8/2018

OTHER PUBLICATIONS

International Search Report and Written Opinion—PCT/CN2020/074706—ISA/EPO—Aug. 19, 2020.
Mediatek Inc: "On Parallel SR and RACH Procedure in NR", 3GPP TSG-RAN WG2 Meeting #101BisR2-1806164, Sanya, China, Apr. 16-20, 2018, 7 Pages.
(Continued)

Primary Examiner — Peter G Solinsky
(74) Attorney, Agent, or Firm — Harrity & Harrity, LLP

(57) ABSTRACT

Various aspects of the present disclosure generally relate to wireless communication. In some aspects, a user equipment (UE) may group, into a common slot, a first plurality of consecutive uplink slots included in a first component carrier and a second plurality of consecutive uplink slots included in a second component carrier. The UE may determine whether an uplink transmission is scheduled in at least one of the first plurality of consecutive uplink slots or the second
(Continued)

plurality of consecutive uplink slots. The UE may transmit on the first component carrier or on the second component carrier in the common slot or determine whether to switch a transmit chain based at least in part on whether an uplink transmission is scheduled in at least one of the first plurality of consecutive uplink slots or the second plurality of consecutive uplink slots. Numerous other aspects are provided.

35 Claims, 11 Drawing Sheets

(51) Int. Cl.
*H04W 72/566* (2023.01)
*H04W 74/0808* (2024.01)

(58) Field of Classification Search
USPC .......................................................... 370/329
See application file for complete search history.

(56) References Cited

U.S. PATENT DOCUMENTS

| | | | |
|---|---|---|---|
| 2018/0332604 A1* | 11/2018 | Lee | H04W 72/20 |
| 2019/0053237 A1 | 2/2019 | Rico et al. | |
| 2019/0132157 A1 | 5/2019 | Hosseini et al. | |
| 2020/0146049 A1* | 5/2020 | Tang | H04L 1/1854 |
| 2020/0359398 A1* | 11/2020 | Takahashi | H04W 8/22 |
| 2021/0144570 A1* | 5/2021 | Chae | H04L 5/0094 |
| 2021/0153143 A1* | 5/2021 | Sridharan | H04B 7/0404 |
| 2021/0160912 A1* | 5/2021 | Fakoorian | H04W 72/23 |
| 2023/0189350 A1* | 6/2023 | Pelletier | H04W 76/27 370/329 |

OTHER PUBLICATIONS

Supplementary European Search Report—EP20890507—Search Authority—The Hague—Nov. 13, 2023.

* cited by examiner

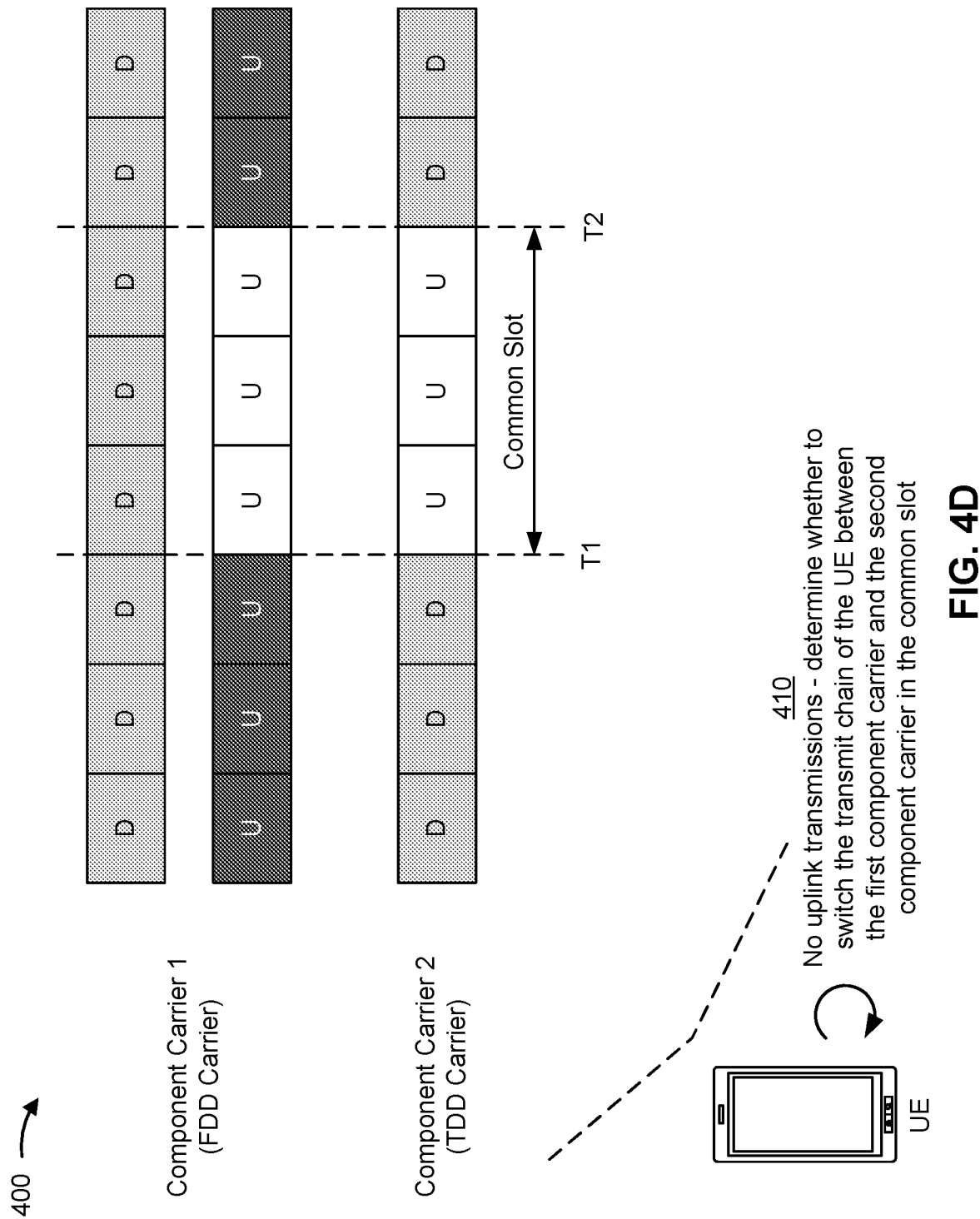

COLLISION HANDLING FOR COMPONENT CARRIER SWITCHING

CROSS-REFERENCE TO RELATED APPLICATIONS

This application is a 371 national stage of Patent Cooperation Treaty (PCT) Application No. PCT/CN2020/074706 filed on Feb. 11, 2020, entitled "COLLISION HANDLING FOR COMPONENT CARRIER SWITCHING," which claims priority to U.S. Provisional Application No. 62/938,797, filed on Nov. 21, 2019, entitled COLLISION HANDLING FOR COMPONENT CARRIER SWITCHING," each of which is are hereby expressly incorporated by reference herein.

FIELD OF THE DISCLOSURE

Aspects of the present disclosure generally relate to wireless communication and to techniques and apparatuses for collision handling for component carrier switching.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include grouping, into a common slot, a first plurality of consecutive uplink slots included in a first component carrier and a second plurality of consecutive uplink slots included in a second component carrier, wherein at least a subset of the first plurality of consecutive uplink slots and at least a subset of the first plurality of consecutive uplink slots overlap; determining whether an uplink transmission is scheduled in at least one of the first plurality of consecutive uplink slots or the second plurality of consecutive uplink slots; and transmitting, based at least in part on determining that an uplink transmission is scheduled in at least one of the first plurality of consecutive uplink slots or the second plurality of consecutive uplink slots, on the first component carrier or on the second component carrier in the common slot, or determining, based at least in part on determining that no uplink transmission is scheduled in at least one of the first plurality of consecutive uplink slots or the second plurality of consecutive uplink slots, whether to switch a transmit chain of the UE between the first component carrier and the second component carrier in the common slot.

In some aspects, a UE for wireless communication may include memory and one or more processors operatively coupled to the memory. The memory and the one or more processors may be configured to group, into a common slot, a first plurality of consecutive uplink slots included in a first component carrier and a second plurality of consecutive uplink slots included in a second component carrier, wherein at least a subset of the first plurality of consecutive uplink slots and at least a subset of the first plurality of consecutive uplink slots overlap; determine whether an uplink transmission is scheduled in at least one of the first plurality of consecutive uplink slots or the second plurality of consecutive uplink slots; and transmit, based at least in part on determining that an uplink transmission is scheduled in at least one of the first plurality of consecutive uplink slots or the second plurality of consecutive uplink slots, on the first component carrier or on the second component carrier in the common slot, or determine, based at least in part on determining that no uplink transmission is scheduled in at least one of the first plurality of consecutive uplink slots or the second plurality of consecutive uplink slots, whether to switch a transmit chain of the UE between the first component carrier and the second component carrier in the common slot.

In some aspects, a non-transitory computer-readable medium may store one or more instructions for wireless communication. The one or more instructions, when executed by one or more processors of a UE, may cause the one or more processors to: group, into a common slot, a first plurality of consecutive uplink slots included in a first component carrier and a second plurality of consecutive uplink slots included in a second component carrier, wherein at least a subset of the first plurality of consecutive uplink slots and at least a subset of the first plurality of consecutive uplink slots overlap; determine whether an uplink transmission is scheduled in at least one of the first plurality of consecutive uplink slots or the second plurality of consecutive uplink slots; and transmit, based at least in part on determining that an uplink transmission is scheduled in at least one of the first plurality of consecutive uplink slots or the second plurality of consecutive uplink slots, on the first component carrier or on the second component carrier in the common slot, or determine, based at least in part on determining that no uplink transmission is scheduled in at least one of the first plurality of consecutive uplink slots or the second plurality of consecutive uplink slots, whether to switch a transmit chain of the UE between the first component carrier and the second component carrier in the common slot.

In some aspects, an apparatus for wireless communication may include means for grouping, into a common slot, a first plurality of consecutive uplink slots included in a first component carrier and a second plurality of consecutive uplink slots included in a second component carrier, wherein at least a subset of the first plurality of consecutive uplink slots and at least a subset of the first plurality of consecutive uplink slots overlap; means for determining whether an uplink transmission is scheduled in at least one of the first plurality of consecutive uplink slots or the second plurality of consecutive uplink slots; and means for transmitting, based at least in part on determining that an uplink transmission is scheduled in at least one of the first plurality of consecutive uplink slots or the second plurality of consecutive uplink slots, on the first component carrier or on the second component carrier in the common slot, or means for determining, based at least in part on determining that no uplink transmission is scheduled in at least one of the first plurality of consecutive uplink slots or the second plurality of consecutive uplink slots, whether to switch a transmit chain of the apparatus between the first component carrier and the second component carrier in the common slot.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 4A-4D are diagrams illustrating one or more examples of collision handling for component carrier switching, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
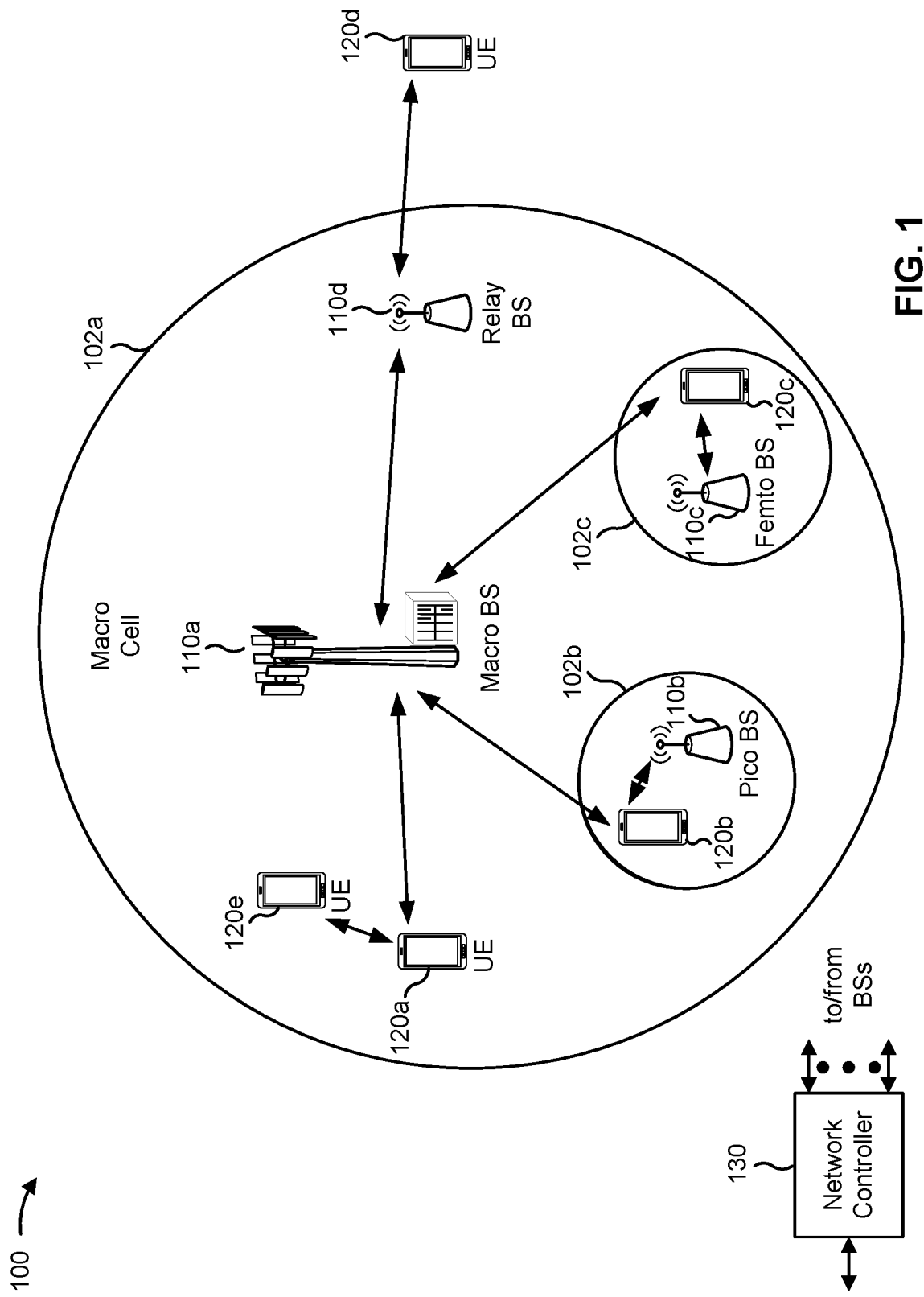
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BSs ubsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
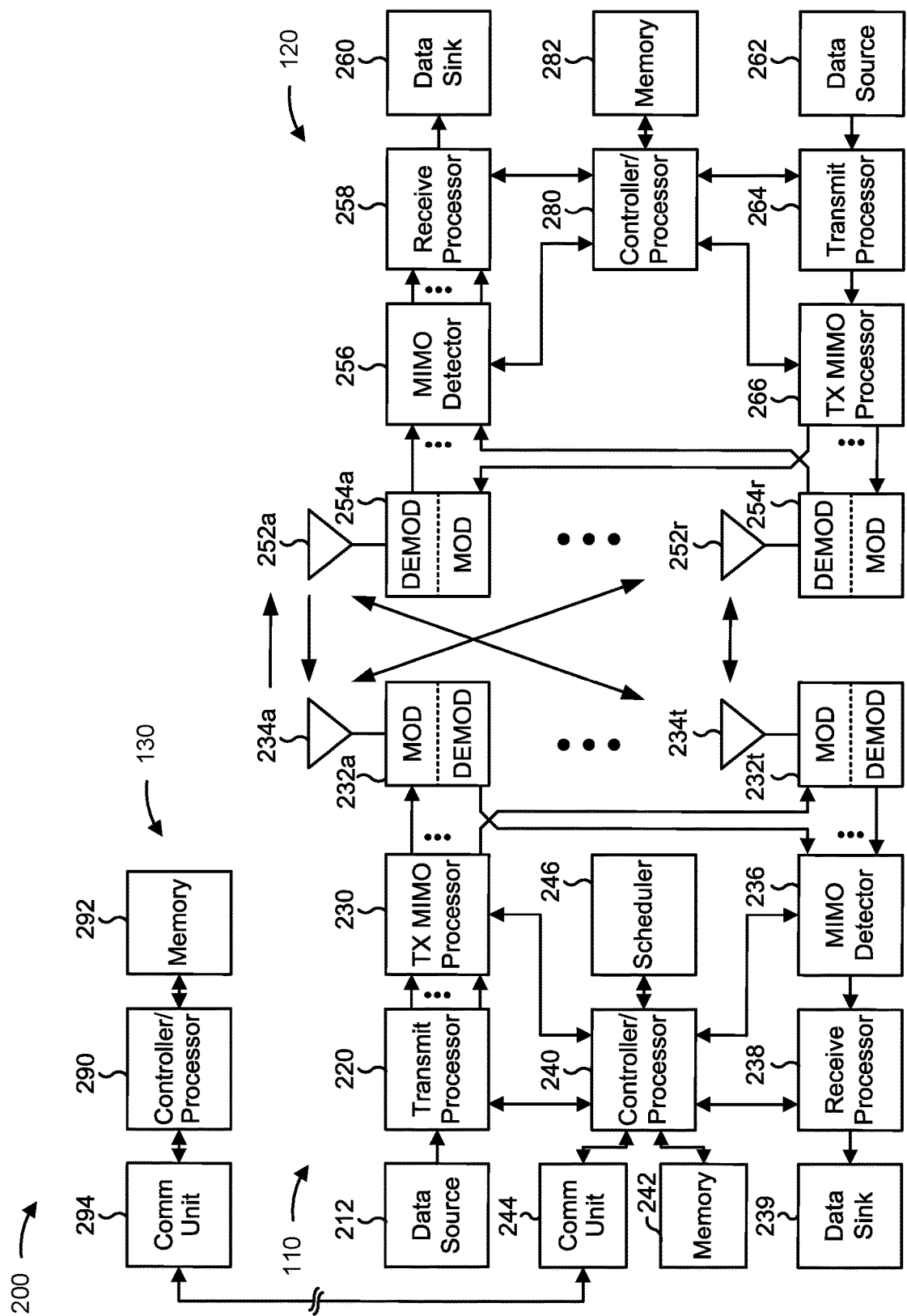
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with collision handling for component carrier switching, as described in more detail elsewhere herein. For example, controller/processor 240 of base station 110, controller/processor 280 of UE 120, and/or any other component(s) of FIG. 2 may perform or direct operations of, for example, process 500 of FIG. 5 and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 500 of FIG. 5 and/or other processes as described herein. A scheduler 246 may schedule UEs for data transmission on the downlink and/or uplink.

In some aspects, UE 120 may include means for grouping, into a common slot, a first plurality of consecutive uplink slots included in a first component carrier and a second plurality of consecutive uplink slots included in a second component carrier, wherein at least a subset of the first plurality of consecutive uplink slots and at least a subset of the first plurality of consecutive uplink slots overlap, means for determining whether an uplink transmission is scheduled in at least one of the first plurality of consecutive uplink slots or the second plurality of consecutive uplink slots, means for transmitting, based at least in part on determining that an uplink transmission is scheduled in at least one of the first plurality of consecutive uplink slots or the second plurality of consecutive uplink slots, on the first component carrier or on the second component carrier in the common slot or determining, based at least in part on determining that no uplink transmission is scheduled in at least one of the first plurality of consecutive uplink slots or the second plurality of consecutive uplink slots, whether to switch a transmit chain of the UE between the first component carrier and the second component carrier in the common slot, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

Figure 3A:
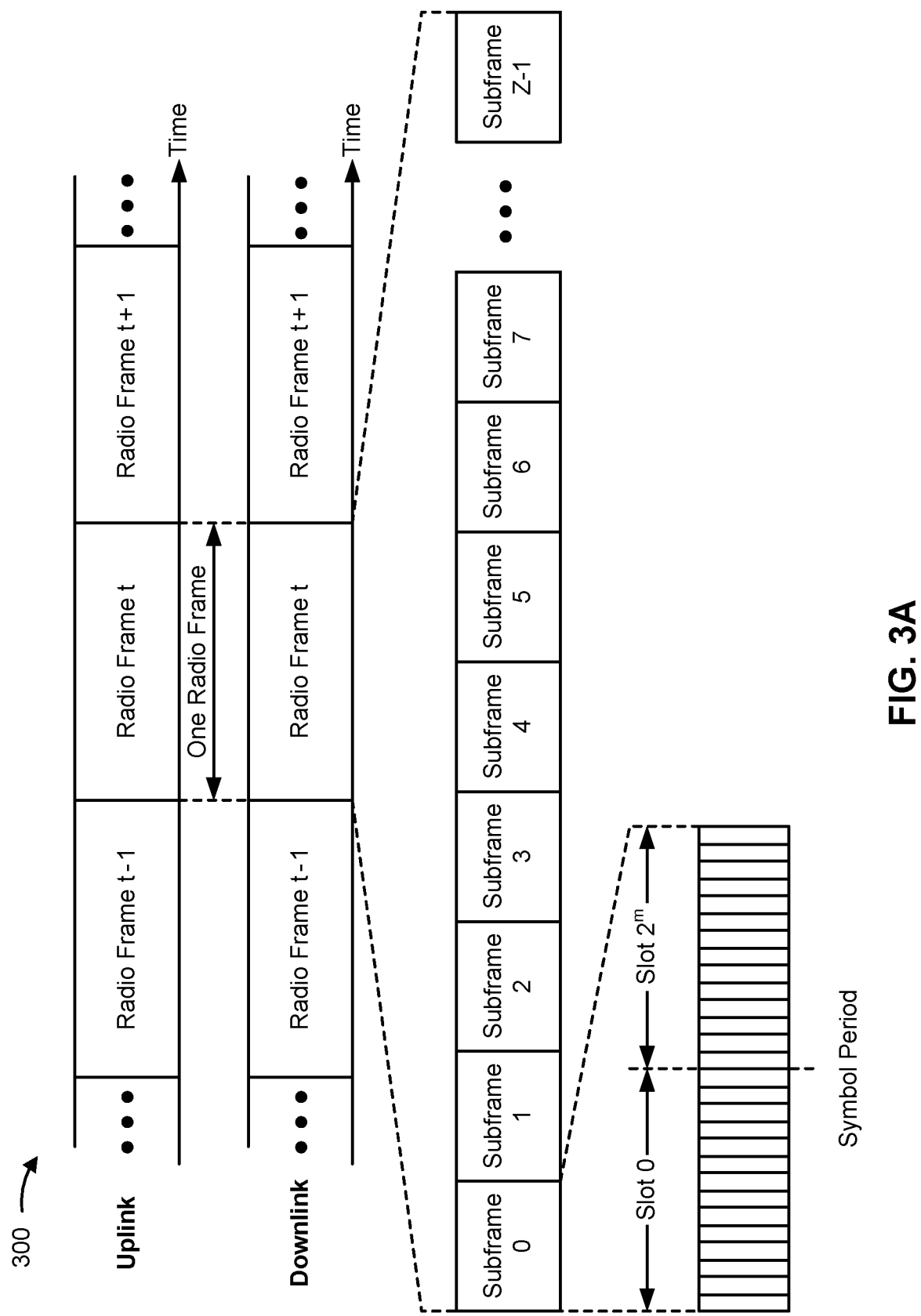
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
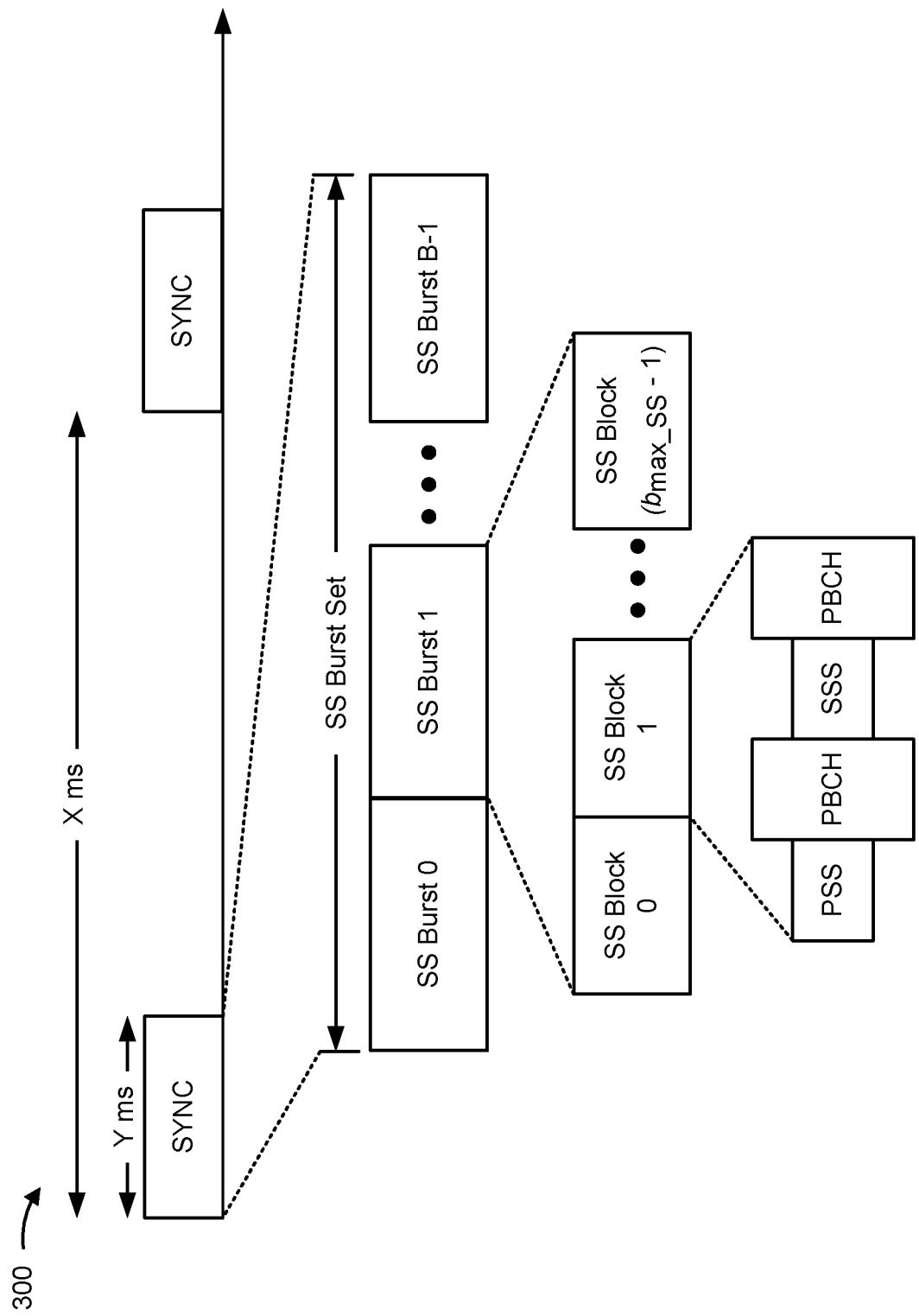
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B-1, where B is a maximum number of repetitions of the SS burst that may be transmitted by the base station). As further shown, each SS burst may include one or more SS blocks (identified as SS block 0 through SS block ($b_{max\_ss}$−1), where $b_{max\_ss}$−1 is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

In a wireless network, a UE may be configured to perform carrier switching when performing one or more uplink transmissions. For example, in a carrier aggregation (CA) configuration, the UE may be configured to transmit one or more portions of an uplink transmission (or one or more uplink transmissions) on a first component carrier (e.g., a first frequency carrier), may be configured to switch a transmit antenna and/or transmit (Tx) chain of the UE from a frequency of the first component carrier to a frequency of a second component carrier, and may be configured to transmit one or more other portions of the uplink transmission (or one or more other uplink transmissions) on the second component carrier.

In some cases, a BS may schedule the UE with at least partially overlapping sets of consecutive uplink slots across the first component carrier and the second component carrier. In this case, it may be possible for the BS to schedule the UE to perform simultaneous and/or at least partially overlapping uplink transmissions on the component carriers. If the UE is only capable of performing one uplink transmission on a component carrier at a time, the scheduling of simultaneous and/or at least partially overlapping uplink transmissions on the component carriers may be referred to as a collision. If the UE is unable to resolve the collision, the collision may result in both uplink transmissions being dropped, which may cause an increase in retransmissions for the UE, may cause delays in the uplink transmissions, and/or the like.

Some aspects described herein provide techniques and apparatuses for collision handling for component carrier switching. In some aspects, a UE may be capable of resolving collisions between overlapping uplink transmissions by grouping. In some aspects, the UE may group a first plurality of consecutive uplink slots included in a first component carrier and a second plurality of consecutive uplink slots included in a second component carrier into a common slot or super slot. The UE may group the first plurality of consecutive uplink slots and the second plurality of consecutive uplink slots into the common slot based at least in part on determining that at least a subset of the first plurality of consecutive uplink slots and at least a subset of the first plurality of consecutive uplink slots overlap.

The UE may be capable of determining whether a collision has occurred in the common slot by determining whether an uplink transmission is scheduled in at least one of the first plurality of consecutive uplink slots or the second plurality of consecutive uplink slots. If a collision has occurred (e.g., if the UE determines that a first uplink transmission is scheduled in the first plurality of consecutive uplink slots and a second uplink transmission is scheduled in the second plurality of consecutive uplink slots), the UE may be capable of resolving the collision by applying one or more priority rules to the first component carrier and the second component carrier to determine whether to transmit the first uplink transmission or the second uplink transmission in the common slot, and drop or refrain from transmitting the non-transmitted uplink transmission. In this way, the UE is capable of resolving collisions, which reduces the quantity of uplink retransmissions for the UE, reduces delays in the uplink transmissions, and/or the like.

FIGS. 4A-4D are diagrams illustrating one or more examples 400 of collision handling for component carrier switching, in accordance with various aspects of the present disclosure. As illustrated in FIGS. 4A-4D, example(s) 400 may include communication by a UE (e.g., UE 120). In some aspects, the UE may be included in a wireless network (e.g., wireless network 100) and may be configured to communicate with one or more BSs (e.g., BSs 110) on an uplink and/or a downlink in the wireless network.

In some aspects, the UE may be configured to perform uplink carrier switching across a plurality of component carriers. For example, the UE may be configured to transmit an uplink transmission on a first component carrier (e.g., component carrier 1), may switch a transmit (Tx) chain of the UE (e.g., a Tx chain including an antenna 252, a MOD 254, a Tx MIMO processor 266, a transmit processor 264, and/or other components) from the frequency of the first component carrier to the frequency of a second component carrier (e.g., component carrier 2) to transmit another uplink transmission, and/or vice-versa. The uplink transmission(s) may include one or more physical uplink control channel (PUCCH) communications, one or more physical uplink shared channel (PUSCH) communications, one or more sounding reference signals (SRSs), one or more channel state information (CSI) reports, and/or other types of uplink communications.

In some aspects, component carrier 2 may include a time division duplexed (TDD) component carrier. In some aspects, the TDD frequency carrier may be a high-frequency carrier, such as a frequency carrier included in a millimeter wave (mmWave) frequency band. The TDD frequency carrier may be a frequency carrier on which uplink resources (e.g., slots, symbols, subframes, and/or the like indicated in FIGS. 4A-4D by a "U") and downlink resources (e.g., slots, symbols, subframes, and/or the like indicated in FIGS. 4A-4D by a "D") are time division duplexed. The UE may use a receive antenna and/or receive (Rx) chain to receive downlink transmissions in the downlink resources and/or may use a transmit antenna and/or Tx chain to transmit uplink transmissions in the uplink resources.

In some aspects, component carrier 1 may include a frequency division duplexed (FDD) component carrier. In some aspects, the FDD component carrier may be a low-frequency carrier, such as a frequency carrier included in a sub-6-GHz frequency band. The FDD component carrier may be a component carrier that includes a plurality of uplink resources (e.g., a plurality of subframes, slots, symbols, and/or the like). Moreover, the FDD component carrier may be a frequency carrier that is frequency division duplexed with another FDD component carrier, configured for the UE, that includes downlink resources. The uplink resources and the downlink resources may be frequency division multiplexed across the FDD component carrier. The UE may use a transmit antenna and/or Tx chain to transmit uplink transmissions in the uplink resources on the FDD frequency carrier and/or may use a receive antenna and/or Rx chain to receive downlink transmissions in the downlink resources on the other FDD frequency carrier.

Figure 4A:
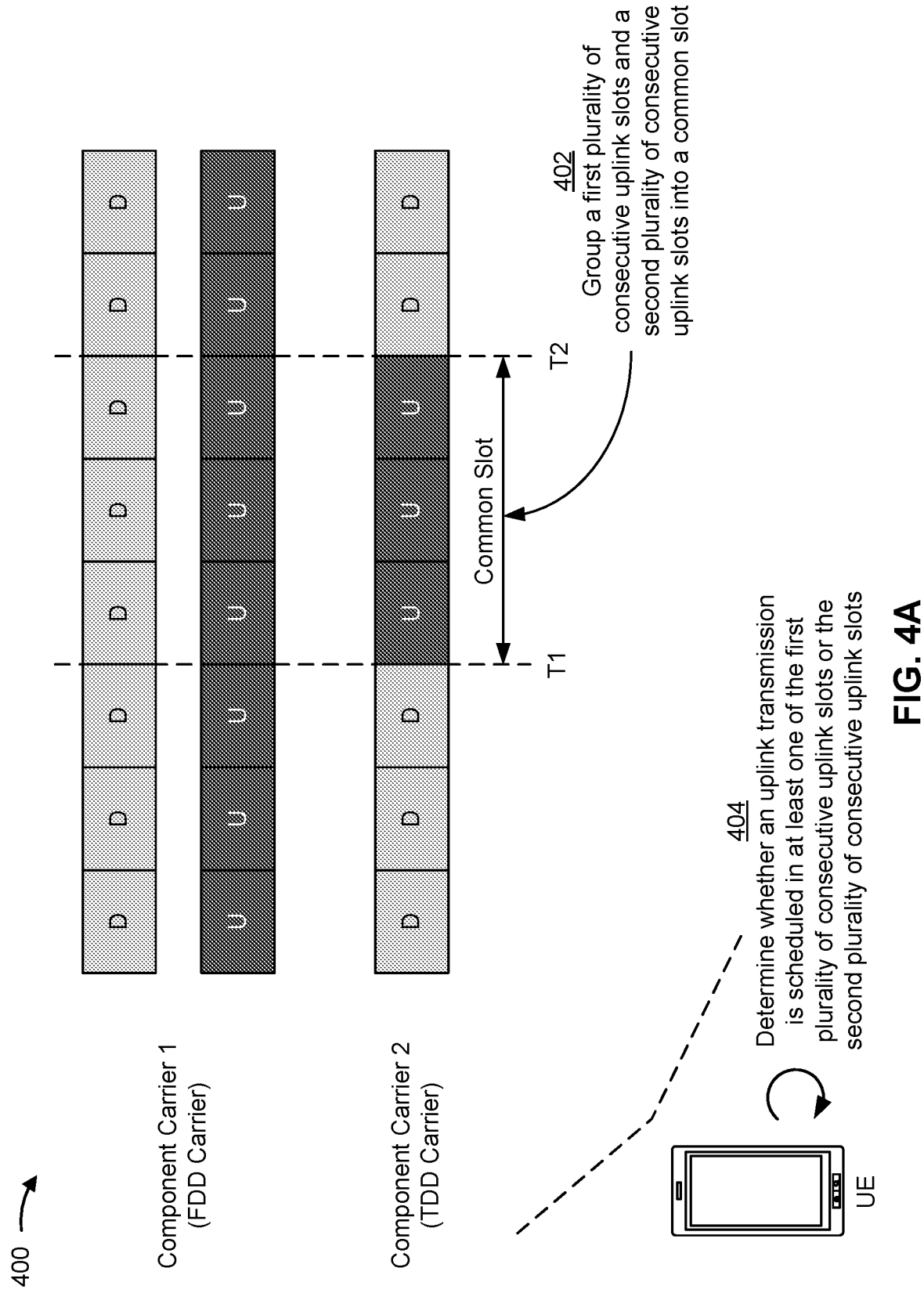

As further shown in FIG. 4A, in some cases, a BS may schedule the UE with at least partially overlapping sets of consecutive uplink slots across component carrier 1 and component carrier 2. In this case, it may be possible for the BS to schedule the UE to perform simultaneous and/or at least partially overlapping uplink transmissions on both component carrier 1 and component carrier 2. If the UE is only capable of performing one uplink transmission on a component carrier at a time, the scheduling of simultaneous and/or at least partially overlapping uplink transmissions on both component carrier 1 and component carrier 2 may be referred to as a collision.

As further shown in FIG. 4A, and by reference number 402, to detect and resolve collisions across a plurality of component carriers, the UE may group a first plurality of consecutive uplink slots in component carrier 1 and a second plurality of consecutive uplink slots in component carrier 2 into a common slot. In some cases, the common slot may also be referred to as a super slot. The UE may group the first plurality of consecutive uplink slots and the second plurality of consecutive uplink slots based at least in part on determining that the first plurality of consecutive uplink slots and the second plurality of consecutive uplink slots at least partially overlap in the time domain. In other words, at least a subset of the first plurality of consecutive uplink slots and at least a subset of the first plurality of consecutive uplink slots overlap in the time domain.

The common slot or super slot may begin at time T1 and end at time T2. If the first plurality of consecutive uplink slots and the second plurality of consecutive uplink slots fully overlap, T1 may occur at the start of the first slot in the first plurality of consecutive uplink slots and the second plurality of consecutive uplink slots, and T2 may occur at the end of the last slot in the first plurality of consecutive uplink slots and the second plurality of consecutive uplink slots. If the first plurality of consecutive uplink slots and the second plurality of consecutive uplink slots partially overlap (e.g., one of the first plurality of consecutive uplink slots and the second plurality of consecutive uplink slots starts prior to the other of the first plurality of consecutive uplink slots and the second plurality of consecutive uplink slots and/or ends prior to the other of the first plurality of consecutive uplink slots and the second plurality of consecutive uplink slots), T1 may occur at the start of the first slot in the earliest commencing plurality of consecutive uplink slots and T2 may occur at the end of the last slot of the last ending plurality of consecutive uplink slots.

As further shown in FIG. 4A, and by reference number 404, the UE may detect collisions in the common slot by determining whether an uplink transmission is scheduled in at least one of the first plurality of consecutive uplink slots or the second plurality of consecutive uplink slots. In some cases, a BS may schedule an uplink transmission in each of the first plurality of consecutive uplink slots and/or an uplink transmission in each of the second plurality of consecutive uplink slots. In some cases, a BS may schedule an uplink transmission in a subset of the first plurality of consecutive uplink slots and/or a subset of the second plurality of consecutive uplink slots. In some cases, a BS may schedule an uplink transmission in each of the first plurality of consecutive uplink slots and a subset of the second plurality of consecutive uplink slots. In some cases, a BS may schedule an uplink transmission in a subset of the first plurality of consecutive uplink slots and in each of the second plurality of consecutive uplink slots.

Figure 4B:
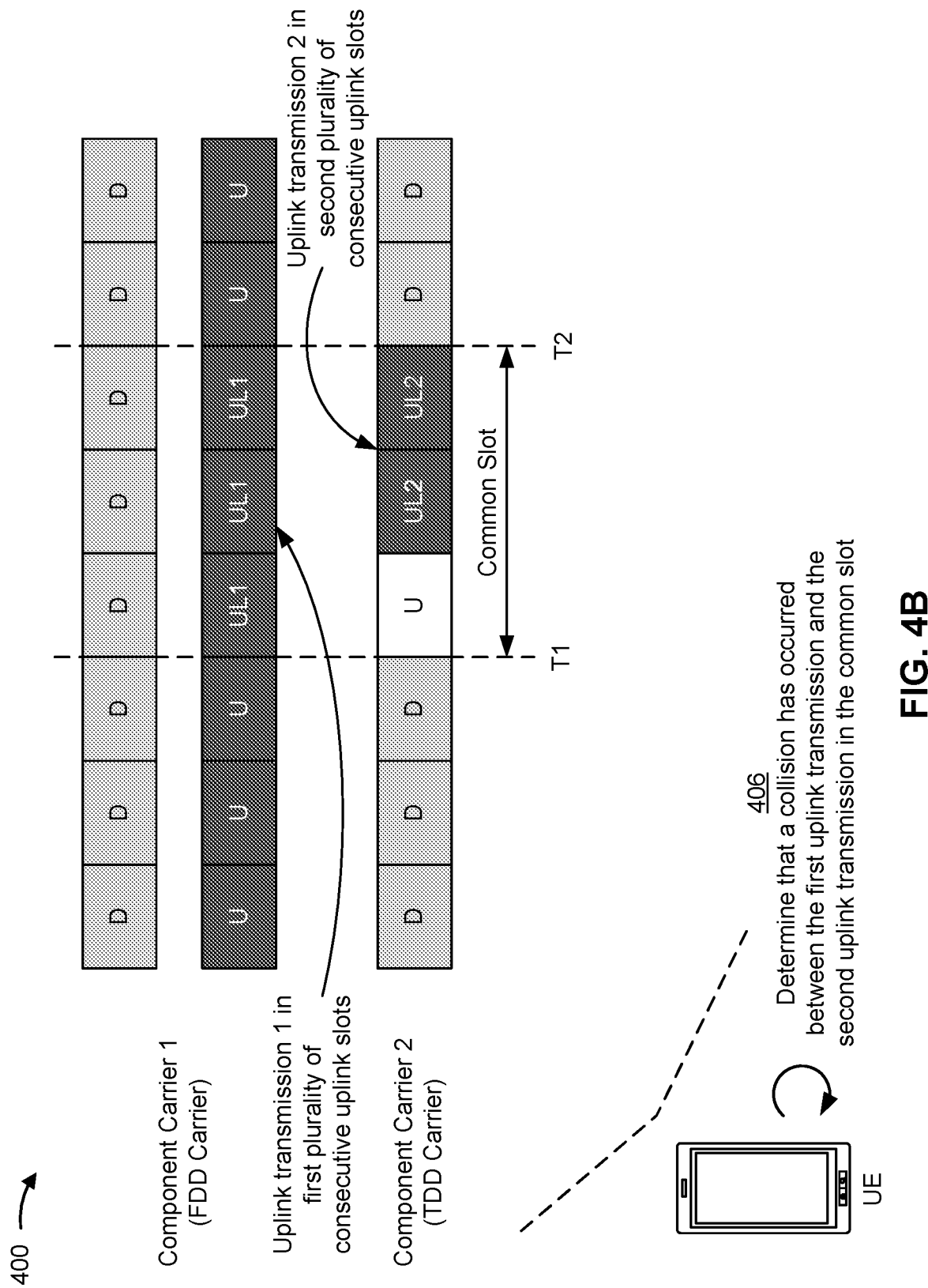

As shown in FIG. 4B, and by reference number 406, the UE may determine that a collision has occurred in the common slot based at least in part on determining that an uplink transmission (uplink transmission 1) is scheduled in one or more of the first plurality of consecutive uplink slots and another uplink transmission (uplink transmission 2) is scheduled in one or more of the second plurality of consecutive uplink slots. In this case, the UE may use various factors, rules, and/or the like to resolve the collision.

In some aspects, the UE may resolve the collision by determining whether to transmit uplink transmission 1 or uplink transmission 2 in the common slot, and to drop or refrain from transmitting the non-transmitted uplink transmission. In this case, the UE may determine whether to transmit uplink transmission 1 or uplink transmission 2 in the common slot based at least in part on respective priorities associated with each of component carrier 1 and component carrier 2. For example, the UE may transmit the uplink transmission that is scheduled on the higher priority component carrier.

In some aspects, the UE may determine the priority of component carrier 1 and the priority of component carrier 2 based at least in part on signaling received from a BS. In this case, the BS may transmit a radio resource control (RRC) communication, a medium access control control element (MAC-CE) communication, a downlink control information (DCI) communication, and/or the like to the UE, which may indicate the priorities of component carrier 1 and component carrier 2. As an example, the BS may indicate that component carrier 1 is higher priority relative to component carrier 2 and, accordingly, UE may transmit uplink transmission 1 in the common slot and may drop or refrain from transmitting uplink transmission 2 in the common slot.

In some aspects, the UE may determine the priority of component carrier 1 and the priority of component carrier 2 based at least in part on which component carrier is associated with a primary cell (PCell) of the UE. In this case, the UE may determine that the component carrier associated with the PCell of the UE is the higher priority component carrier. As an example, the UE may determine that component carrier 2 is associated with a PCell of the UE and, accordingly, UE may transmit uplink transmission 2 in the common slot and may drop or refrain from transmitting uplink transmission 1 in the common slot.

In some aspects, the UE may determine the priority of component carrier 1 and the priority of component carrier 2 based at least in part on which component carrier is the lower frequency component carrier. In this case, the UE may determine that the component carrier associated with the lowest frequency is the higher priority component carrier because the lower frequency component carrier may be more reliable relative to higher frequency component carriers. As an example, the UE may determine that component carrier 1 is a lower frequency component carrier relative to component carrier 2 and, accordingly, UE may transmit uplink transmission 1 in the common slot and may drop or refrain from transmitting uplink transmission 2 in the common slot.

Alternatively and/or additionally to resolving the collision, the UE may be configured to detect the collision as an error case. In other words, if the UE detects the collision, the UE may determine that an error (e.g., a scheduling error) has occurred. In this case, the UE may perform various actions based at least in part on determining that the error has occurred, such as transmitting an indication to the BS that scheduled uplink transmission 1 and uplink transmission 2 that the error has occurred, refraining from transmitting uplink transmission 1 and uplink transmission 2, transmitting uplink transmission 1 or uplink transmission 2 (e.g., and dropping or refraining from transmitting the non-transmitted uplink transmission), transmitting the uplink transmission in the PCell of the UE, and/or the like.

Figure 4C:
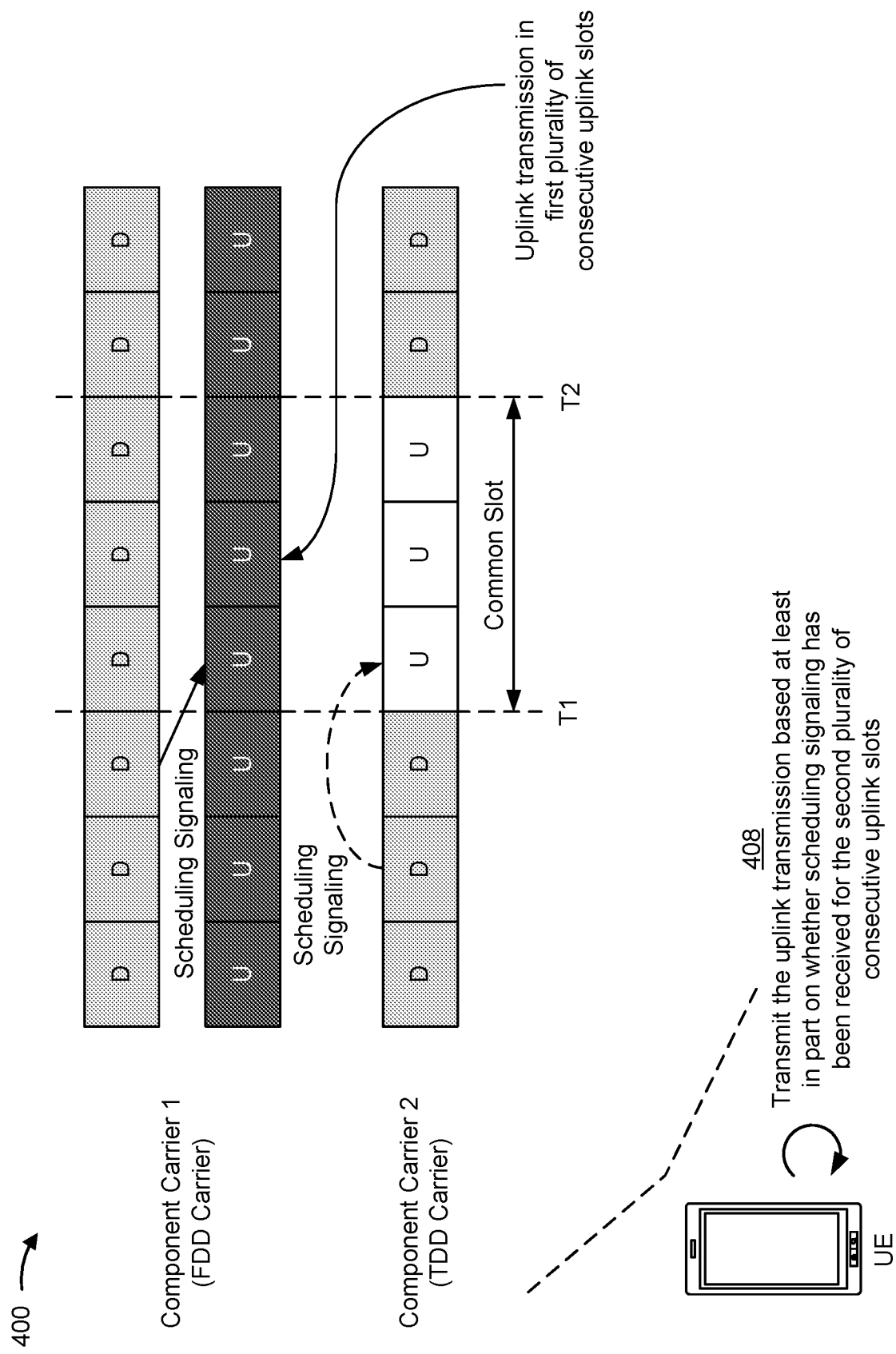

As shown in FIG. 4C, in some cases, the UE may receive explicit signaling (e.g., an RRC communication, a MAC-CE communication, a DCI communication, and/or the like from a BS) the schedules an uplink transmission in the first plurality of consecutive uplink slots (or in the second plurality of consecutive uplink slots). In this case, the UE may determine that no collision has occurred in the common slot as the UE may not have received explicit signaling indicating that another uplink transmission is scheduled in the second plurality of consecutive uplink slots.

As further shown in FIG. 4C, and by reference number 408, the UE may transmit the uplink transmission based at least in part on determining whether any scheduling signaling has been received for the second plurality of consecutive uplink slots. Accordingly, the UE may search for dynamic, persistent and/or periodic, semi-persistent, and/or other types of scheduling signaling that may indicate that another uplink transmission is scheduled in the second plurality of consecutive uplink slots. In this case, the UE may search various scheduling signaling in a particular order. For example, an order may include searching DCI associated with the second plurality of consecutive uplink slots for scheduling signaling first, and then searching an RRC configuration associated with the second plurality of consecutive uplink slots for scheduling signaling after searching the DCI. For example, an order may include searching an RRC configuration associated with the second plurality of consecutive uplink slots for scheduling signaling first, and then searching DCI associated with the second plurality of consecutive uplink slots for scheduling signaling after searching the RRC configuration.

If the UE is not able to locate scheduling signaling that schedules another uplink transmission in the second plurality of consecutive uplink slots, the UE may transmit the uplink transmission in the first plurality of consecutive uplink slots. If the UE locates scheduling signaling that schedules another uplink transmission in the second plurality of consecutive uplink slots, the UE may determine that a collision has occurred and may resolve the collision and/or determine that an error has occurred using one or more of the techniques described above in connection with FIG. 4B.

In some aspects, if the UE resolves the collision by determining to perform carrier switching on the Tx chain of the UE (e.g., from component carrier 1 to component carrier 2, or from component carrier 2 to component carrier 1), the UE may determine when to perform the carrier switching. In some aspects, the UE may perform the carrier switching during the first TDD slot (e.g., the first slot of the second plurality of consecutive uplink slots on component carrier 2) that occurs after a permitted carrier switching boundary. In some aspects, the first TDD slot may be the first slot in the common slot. Accordingly, in these examples, the UE may perform the carrier switching in the first TDD slot regardless of whether scheduling signaling was received for other TDD slots in the common slot at the same time the scheduling signaling was received for the first TDD slot.

In some aspects, the UE may perform the carrier switching during the first TDD slot that occurs after the permitted carrier switching boundary and any other TDD slots for which scheduling signaling was received at the same time that the scheduling signaling for the first TDD slot was received. In these examples, if scheduling signaling is received for a plurality of TDD slots, the scheduling signaling may indicate a transmit precoder matrix indicator (TPMI) of [0,1] or [1,1] and/or two sounding reference signal (SRS) ports. If scheduling signaling is received for a single TDD slot, the uplink transmission may be a grant free transmission, a PUCCH transmission, a scheduling request, a random access channel (RACH) communication, a transmission with a TPMI of [1,0], a PUSCH granted by a DCI format 0_0 communication, a single port configured grant, and/or the like. In some aspects, the UE may perform the carrier switching at every TDD slot boundary on component carrier 2.

In some aspects, after performing the uplink transmission (e.g., in either the first plurality of consecutive uplink slots or the second plurality of consecutive uplink slots), the UE may perform carrier switching at the end of the common slot to switch the Tx chain of the UE back to a particular or default component carrier. For example, if the specified or default component carrier is component carrier 1, and the UE performs the uplink transmission in the second plurality of consecutive uplink slots on component carrier 2, the UE may perform carrier switching at the end of the common slot (or after performing the uplink transmission in the common slot) to switch the Tx chain of the UE to component carrier 1. As another example, if the specified or default component carrier is component carrier 2, and the UE performs the uplink transmission in the first plurality of consecutive uplink slots on component carrier 1, the UE may perform carrier switching at the end of the common slot (or after performing the uplink transmission in the common slot) to switch the Tx chain of the UE to component carrier 2. In some aspects, if the UE performs the uplink transmission on the specified or default component carrier, the UE may refrain from performing carrier switching at the end of the common slot.

As shown in FIG. 4D, in some cases, no uplink transmissions may be scheduled in the first plurality of consecutive uplink slots and no uplink transmissions may be scheduled in the second plurality of consecutive uplink slots. In this case, the UE has no uplink transmissions to transmit in the common slot, and may determine that no collision has occurred.

As further shown in FIG. 4D, and by reference number 410, if no uplink transmissions are scheduled in the common slot, the UE may determine whether to still perform carrier switching on the Tx chain of the UE during the common slot. In this case, the UE may determine whether to switch the Tx chain of the UE from the frequency of component carrier 1 to component carrier 2 during the common slot and/or may determine whether to switch the Tx chain of the UE from the frequency of component carrier 2 to component carrier 1 during the common slot.

In some aspects, the UE may determine to refrain from performing carrier switching of the Tx chain of the UE during the common slot unless explicit scheduling signaling is received (e.g., scheduling signaling that schedules an uplink transmission), which may conserve power at the UE. In some aspects, the UE may determine to switch the Tx chain of the UE to a default component carrier during the common slot. In some aspects, the UE may determine to switch the Tx chain of the UE to a component carrier associated with a PCell of the UE during the common slot. In some aspects, the UE may determine to switch the Tx chain of the UE to the lowest frequency component carrier or the lower frequency component carrier (e.g., the lower frequency component carrier of component carrier 1 and component carrier 2) during the common slot.

In this way, the UE may be capable of resolving collisions between overlapping uplink transmissions by grouping. The UE may group a first plurality of consecutive uplink slots included in a first component carrier and a second plurality of consecutive uplink slots included in a second component carrier into a common slot or super slot. The UE may group the first plurality of consecutive uplink slots and the second plurality of consecutive uplink slots into the common slot based at least in part on determining that at least a subset of the first plurality of consecutive uplink slots and at least a subset of the first plurality of consecutive uplink slots overlap. The UE may be capable of determining whether a collision has occurred in the common slot by determining whether an uplink transmission is scheduled in at least one of the first plurality of consecutive uplink slots or the second plurality of consecutive uplink slots. If a collision has occurred (e.g., if the UE determines that a first uplink transmission is scheduled in the first plurality of consecutive uplink slots and a second uplink transmission is scheduled in the second plurality of consecutive uplink slots), the UE may be capable of resolving the collision by applying one or more priority rules to the first component carrier and the second component carrier to determine whether to transmit the first uplink transmission or the second uplink transmission in the common slot, and drop or refrain from transmitting the non-transmitted uplink transmission. In this way, the UE is capable of resolving collisions, which reduces the quantity of uplink retransmissions for the UE, reduces delays in the uplink transmissions, and/or the like.

As indicated above, FIGS. 4A-4D are provided as one or more examples. Other examples may differ from what is described with respect to FIGS. 4A-4D. For example, while the examples illustrated and described above in connection with FIGS. 4A-4D include an FDD component carrier and a TDD component carrier, the techniques described herein may be used in cases where a UE is configured with two TDD component carriers, with two FDD component carriers, and/or the like. Moreover, the techniques described herein may be used in cases where a UE is configured with greater than two component carriers, where the UE is configured with a plurality of component carrier groups, and/or the like. In the case where the UE is configured with a plurality of component carrier groups, the component carriers in a component carrier group may be configured such that no more than one uplink transmission is scheduled at a given time in the component carrier group, and no carrier switching is required within the component carrier group. Moreover, the scheduling in a component carrier group may be provided in a PCell to reduce the complexity of detecting collisions, and/or only one component carrier in the component carrier group may be permitted to be configured with uplink slots such that the UE only needs to check the component carrier configured with uplink slots.

Figure 5:
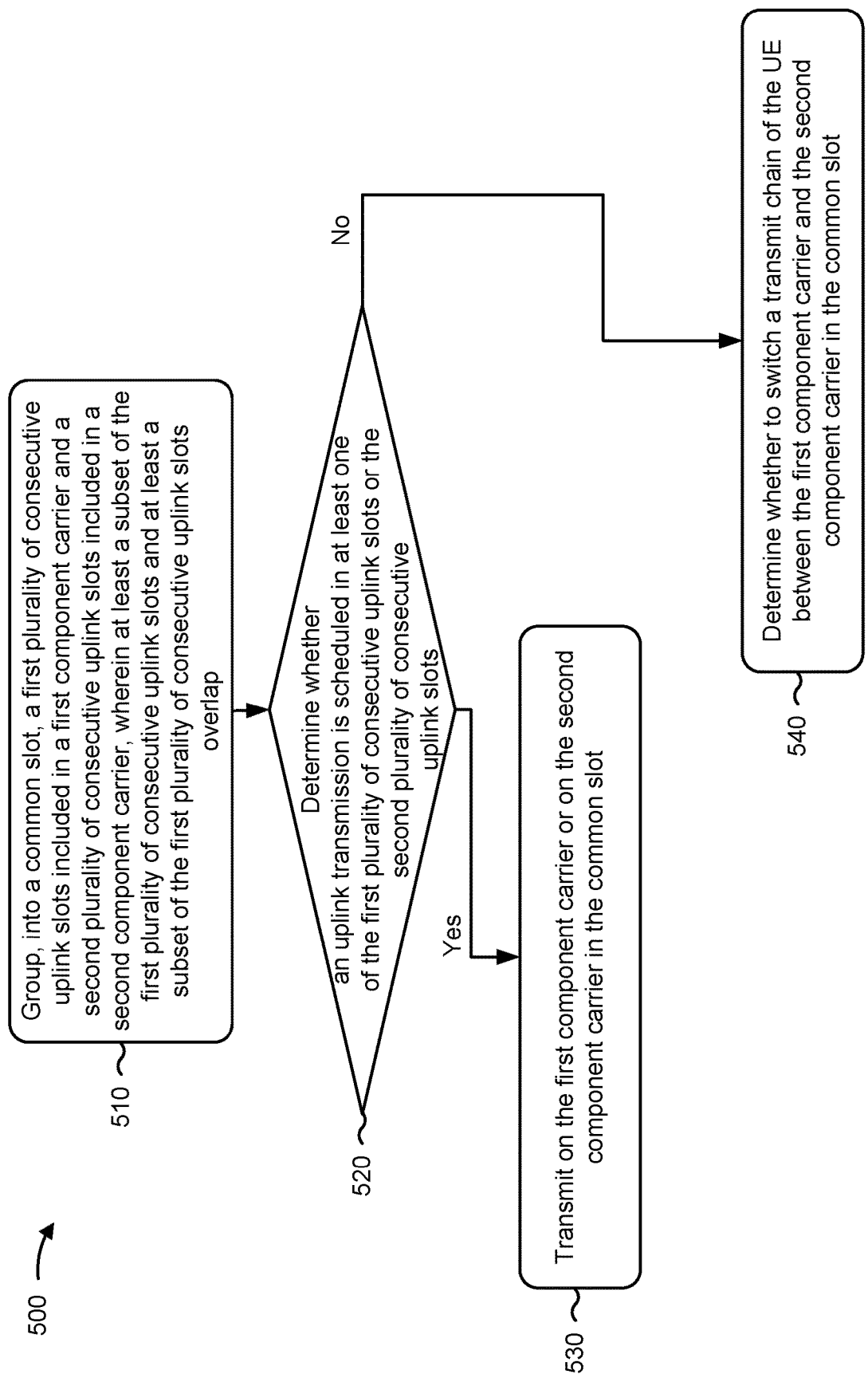
FIG. 5 is a diagram illustrating an example process performed, for example, by a UE, in accordance with various aspects of the present disclosure.

FIG. 5 is a diagram illustrating an example process 500 performed, for example, by a UE, in accordance with various aspects of the present disclosure. Example process 500 is an example where the UE (e.g., UE 120) performs operations associated with collision handling for component carrier switching.

As shown in FIG. 5, in some aspects, process 500 may include grouping, into a common slot, a first plurality of consecutive uplink slots included in a first component carrier and a second plurality of consecutive uplink slots included in a second component carrier, wherein at least a subset of the first plurality of consecutive uplink slots and at least a subset of the first plurality of consecutive uplink slots overlap (block 510). For example, the UE (e.g., using receive processor 258, transmit processor 264, controller/processor 280, memory 282, and/or the like) may group, into a common slot, a first plurality of consecutive uplink slots included in a first component carrier and a second plurality of consecutive uplink slots included in a second component carrier, as described above in connection with FIGS. 4A-4D. In some aspects, at least a subset of the first plurality of consecutive uplink slots and at least a subset of the first plurality of consecutive uplink slots overlap.

As further shown in FIG. 5, in some aspects, process 500 may include determining whether an uplink transmission is scheduled in at least one of the first plurality of consecutive uplink slots or the second plurality of consecutive uplink slots (block 520). For example, the UE (e.g., using receive processor 258, transmit processor 264, controller/processor 280, memory 282, and/or the like) may determine whether an uplink transmission is scheduled in at least one of the first plurality of consecutive uplink slots or the second plurality of consecutive uplink slots, as described above in connection with FIGS. 4A-4D. In some aspects, determining whether an uplink transmission is scheduled in at least one of the first plurality of consecutive uplink slots or the second plurality of consecutive uplink slots comprises determining that a first uplink transmission is scheduled in at least a subset of the first plurality of consecutive uplink slots, determining that a second uplink transmission is scheduled in at least a subset of the second plurality of consecutive uplink slots, and determining that a collision has occurred between the first uplink transmission and the second uplink transmission in the common slot.

As further shown in FIG. 5, if the UE determines that an uplink transmission is scheduled in at least one of the first plurality of consecutive uplink slots or the second plurality of consecutive uplink slots in some aspects (block 520—Yes), process 500 may include transmitting on the first component carrier or on the second component carrier in the common slot (block 530). For example, the UE (e.g., using receive processor 258, transmit processor 264, controller/processor 280, memory 282, and/or the like) may transmit, based at least in part on determining that an uplink transmission is scheduled in at least one of the first plurality of consecutive uplink slots or the second plurality of consecutive uplink slots, on the first component carrier or on the second component carrier in the common slot, as described above in connection with FIGS. 4A-4D.

In some aspects, transmitting on the first component carrier or on the second component carrier in the common slot comprises transmitting, based at least in part on determining that the collision has occurred, the first uplink transmission on the first component carrier in the common slot or transmitting the second uplink transmission on the second component carrier in the common slot based at least in part on a first priority associated with the first component carrier and a second priority associated with the second component carrier. In some aspects, process 500 includes switching the transmit chain of the UE to a default component carrier after transmitting the first uplink transmission or the second uplink transmission. In some aspects, transmitting on the first component carrier or on the second component carrier in the common slot comprises transmitting the first uplink transmission on the first component carrier in the common slot based at least in part on determining that the first priority is greater relative to the second priority.

In some aspects, transmitting on the first component carrier or on the second component carrier in the common slot comprises refraining, based at least in part on determining that the error has occurred, from transmitting on the first component carrier or on the second component carrier in the common slot, transmitting, based at least in part on determining that the error has occurred, the first uplink transmission on the first component carrier in the common slot or transmitting the second uplink transmission on the second component carrier in the common slot, or transmitting, based at least in part on determining that the error has occurred, the first uplink transmission on the first component carrier in the common slot based at least in part on the first component carrier being associated with a primary cell of the UE.

In some aspects, determining that an uplink transmission is scheduled in at least one of the first plurality of consecutive uplink slots or the second plurality of consecutive uplink slots comprises determining that an uplink transmission is scheduled in at least a subset of the first plurality of consecutive uplink slots, determining that no scheduling signaling has been received for the second plurality of consecutive uplink slots, and transmitting the uplink transmission on the first component carrier in the common slot based at least in part on determining that no scheduling signaling has been received for the second plurality of consecutive uplink slots.

In some aspects, determining that no scheduling signaling has been received for the second plurality of consecutive uplink slots comprises searching DCI associated with the second plurality of consecutive uplink slots for scheduling signaling and searching, after searching the DCI associated with the second plurality of consecutive uplink slots, a radio resource control configuration associated with the second plurality of consecutive uplink slots for scheduling signaling. In some aspects, determining that no scheduling signaling has been received for the second plurality of consecutive uplink slots comprises searching an RRC configuration associated with the second plurality of consecutive uplink slots for scheduling signaling and searching, after searching the RRC configuration associated with the second plurality of consecutive uplink slots, downlink control information associated with the second plurality of consecutive uplink slots for scheduling signaling.

As further shown in FIG. 5, if the UE determines that no uplink transmission is scheduled in at least one of the first plurality of consecutive uplink slots or the second plurality of consecutive uplink slots (block 520-No), in some aspects, process 500 may include determining whether to switch a transmit chain of the UE between the first component carrier and the second component carrier in the common slot (block 540). For example, the UE (e.g., using receive processor 258, transmit processor 264, controller/processor 280, memory 282, and/or the like) may determine, based at least in part on determining that no uplink transmission is scheduled in at least one of the first plurality of consecutive uplink slots or the second plurality of consecutive uplink slots, whether to switch a transmit chain of the UE between the first component carrier and the second component carrier in the common slot, as described above in connection with FIGS. 4A-4D.

In some aspects, determining whether to switch the transmit chain of the UE between the first component carrier and the second component carrier in the common slot comprises refraining from switching the transmit chain of the UE between the first component carrier and the second component carrier in the common slot until receiving a scheduling communication that causes the UE to switch the transmit chain of the UE between the first component carrier and the second component carrier, switching to the first component carrier in the common slot based at least in part on the first component carrier being a default component carrier of the UE, switching to the first component carrier in the common slot based at least in part on the first component carrier being associated with a primary cell of the UE, or switching to the first component carrier in the common slot based at least in part on the first component carrier being a lower frequency component carrier relative to the second component carrier.

Process 500 may include additional aspects, such as any single aspect or any combination of aspects described below and/or in connection with one or more other processes described elsewhere herein.

In some aspects, process 500 further comprises determining that the first priority is greater relative to the second priority based at least in part on at least one of the first component carrier being associated with a primary cell of the UE, the first component carrier being a lower frequency relative to the second component carrier, or receiving, from a BS, an indication of the first priority and the second priority.

In some aspects, the first component carrier is included in a first component carrier group. In some aspects, simultaneous uplink transmissions are not permitted across component carriers in the first component carrier group. In some aspects, process 500 further comprises receiving scheduling signaling from a primary cell in the first component carrier group and receiving scheduling signaling from a primary cell in the second component carrier group. In some aspects, the first component carrier is a time division multiplexed component carrier that supports two or more transmit ports and the first component carrier supports switching between consecutive uplink slots or within uplink slots.

In some aspects, process 500 includes switching, based at least in part on determining that the collision has occurred, the transmit chain of the UE between the first component carrier and the second component carrier in a first slot that occurs after a permitted carrier switching boundary. In some aspects, process 500 includes switching, based at least in part on determining that the collision has occurred, the transmit chain of the UE between the first component carrier and the second component carrier in a first slot that occurs after a permitted carrier switching boundary and after one or more other slots for which scheduling signaling was received at a same time as scheduling signaling was received for the first slot. In some aspects, process 500 includes switching, based at least in part on determining that the collision has occurred, the transmit chain of the UE between the first component carrier and the second component carrier before or after any slot boundary of the common slot.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
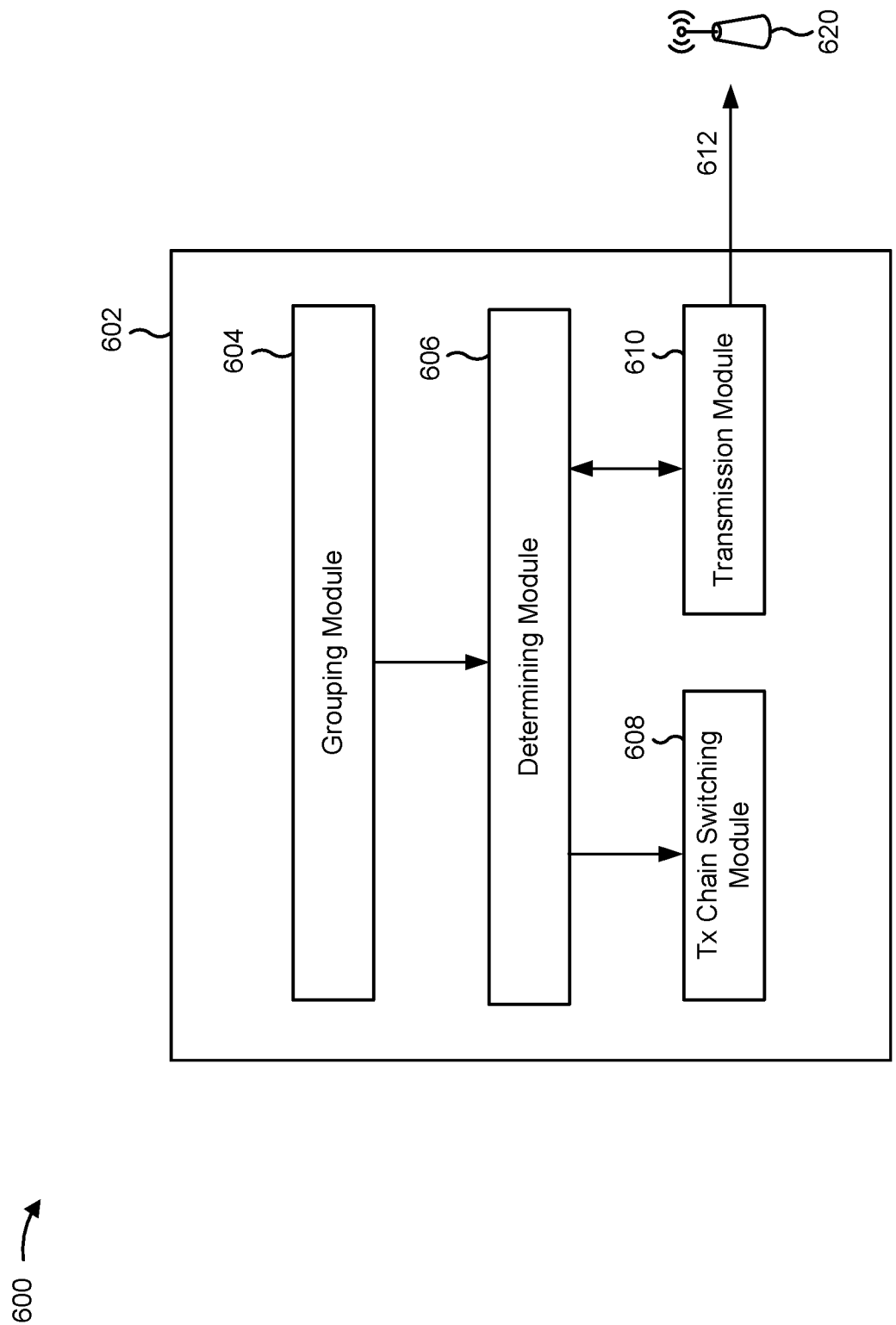
FIG. 6 is a conceptual data flow diagram illustrating data flow between different modules/means/components in an example apparatus, in accordance with various aspects of the present disclosure.

FIG. 6 is a conceptual data flow diagram 600 illustrating data flow between different modules/means/components in an example apparatus 602. The apparatus 602 may be a UE (e.g., UE 120). In some aspects, the apparatus 602 includes a grouping module 604, a determining module 606, a Tx chain switching module 608, and a transmission module 610.

In some aspects, grouping module 604 may group, into a common slot, a first plurality of consecutive uplink slots included in a first component carrier and a second plurality of consecutive uplink slots included in a second component carrier. In some aspects, grouping module 604 may group the first plurality of consecutive uplink slots and the second plurality of consecutive uplink slots into the common slot based at least in part on determining that at least a subset of the first plurality of consecutive uplink slots and at least a subset of the first plurality of consecutive uplink slots overlap. In some aspects, grouping module 604 may include a transmit processor (e.g., transmit processor 264), a Tx MIMO processor (e.g., TX MIMO processor 266), a controller/processor (e.g., controller/processor 280), a memory (e.g., a memory 282), and/or the like.

In some aspects, determining module 606 may determine whether an uplink transmission is scheduled in at least one of the first plurality of consecutive uplink slots or the second plurality of consecutive uplink slots. In some aspects, determining module 606 may include a transmit processor (e.g., transmit processor 264), a Tx MIMO processor (e.g., TX MIMO processor 266), a controller/processor (e.g., controller/processor 280), a memory (e.g., a memory 282), and/or the like.

In some aspects, transmission module 610 may transmit on the first component carrier or on the second component carrier in the common slot. In some aspects, transmission module 610 may transmit on the first component carrier or on the second component carrier in the common slot based at least in part on the determination of determining module 606 that an uplink transmission is scheduled in at least one of the first plurality of consecutive uplink slots or the second plurality of consecutive uplink slots. In some aspects, transmission module 610 may include an antenna (e.g., antenna 252), a MOD (e.g., MOD 254), a transmit processor (e.g., transmit processor 264), a Tx MIMO processor (e.g., Tx MIMO processor 266), a controller/processor (e.g., controller/processor 280), a memory (e.g., a memory 282), and/or the like.

In some aspects, Tx chain switching module 608 may determine whether to switch a Tx chain of the apparatus 602 between the first component carrier and the second component carrier in the common slot. In some aspects, Tx chain switching module 608 may determine whether to switch a Tx chain of the apparatus 602 between the first component carrier and the second component carrier in the common slot based at least in part on the determination of module 606 that no uplink transmission is scheduled in at least one of the first plurality of consecutive uplink slots or the second plurality of consecutive uplink slots. In some aspects, Tx chain switching module 608 may include an antenna (e.g., antenna 252), a MOD (e.g., MOD 254), a transmit processor (e.g., transmit processor 264), a Tx MIMO processor (e.g., Tx MIMO processor 266), a controller/processor (e.g., controller/processor 280), a memory (e.g., a memory 282), and/or the like.

The apparatus may include additional modules that perform each of the blocks of the algorithm in the aforementioned process 500 of FIG. 5 and/or the like. Each block in the aforementioned process 500 of FIG. 5 and/or the like may be performed by a module, and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 6 are provided as an example. In practice, there may be additional modules, fewer modules, different modules, or differently arranged modules than those shown in FIG. 6. Furthermore, two or more modules shown in FIG. 6 may be implemented within a single module, or a single module shown in FIG. 6 may be implemented as multiple, distributed modules. Additionally, or alternatively, a set of modules (e.g., one or more modules) shown in FIG. 6 may perform one or more functions described as being performed by another set of modules shown in FIG. 6.

Figure 7:
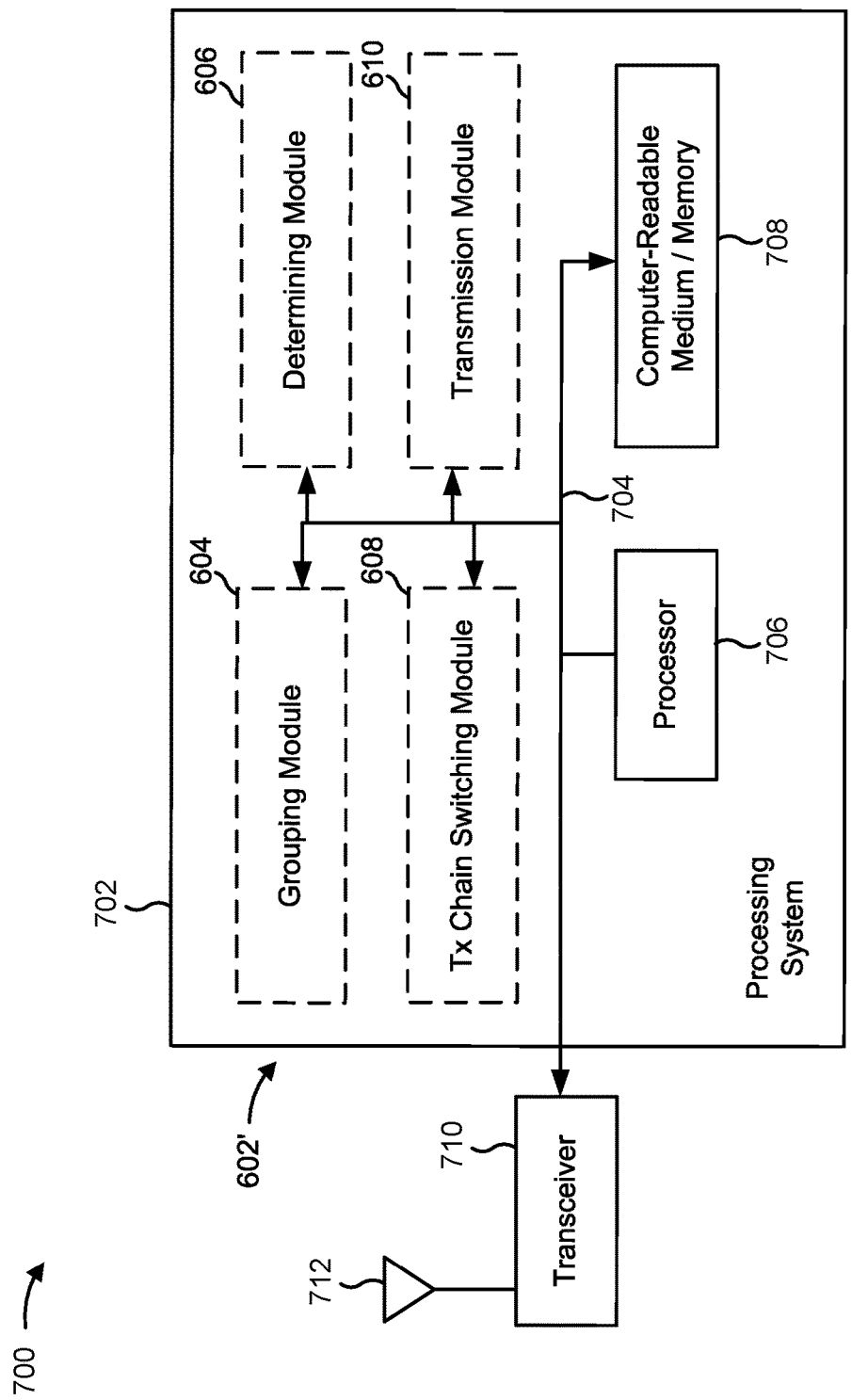
FIG. 7 is a diagram illustrating an example of a hardware implementation for an apparatus employing a processing system, in accordance with various aspects of the present disclosure.

FIG. 7 is a diagram 700 illustrating an example of a hardware implementation for an apparatus 602' employing a processing system 702. The apparatus 602' may be a UE (e.g., UE 120).

The processing system 702 may be implemented with a bus architecture, represented generally by the bus 704. The bus 704 may include any number of interconnecting buses and bridges depending on the specific application of the processing system 702 and the overall design constraints. The bus 704 links together various circuits including one or more processors and/or hardware modules, represented by the processor 706, the modules 604, 606, 608, and 610, and the computer-readable medium/memory 708. The bus 704 may also link various other circuits such as timing sources, peripherals, voltage regulators, and power management circuits, which are well known in the art, and therefore will not be described any further.

The processing system 702 may be coupled to a transceiver 710. The transceiver 710 is coupled to one or more antennas 712. The transceiver 710 provides a means for communicating with various other apparatuses over a transmission medium. The transceiver 710 receives a signal from the one or more antennas 712, extracts information from the received signal, and provides the extracted information to the processing system 702. In addition, the transceiver 710 receives information from the processing system 702, specifically the transmission module 610, and based at least in part on the received information, generates a signal to be applied to the one or more antennas 712. The processing system 702 includes a processor 706 coupled to a computer-readable medium/memory 708. The processor 706 is responsible for general processing, including the execution of software stored on the computer-readable medium/memory 708. The software, when executed by the processor 706, causes the processing system 702 to perform the various functions described herein for any particular apparatus. The computer-readable medium/memory 708 may also be used for storing data that is manipulated by the processor 706 when executing software. The processing system further includes at least one of the modules 604, 606, 608, and 610. The modules may be software modules running in the processor 706, resident/stored in the computer readable medium/memory 708, one or more hardware modules coupled to the processor 806, or some combination thereof. The processing system 702 may be a component of the UE 120 and may include the memory 282 and/or at least one of the TX MIMO processor 266, the RX processor 258, and/or the controller/processor 280.

In some aspects, the apparatus 602/602' for wireless communication includes means for grouping, into a common slot, a first plurality of consecutive uplink slots included in a first component carrier and a second plurality of consecutive uplink slots included in a second component carrier, wherein at least a subset of the first plurality of consecutive uplink slots and at least a subset of the first plurality of consecutive uplink slots overlap, means for determining whether an uplink transmission is scheduled in at least one of the first plurality of consecutive uplink slots or the second plurality of consecutive uplink slots, means for transmitting, based at least in part on determining that an uplink transmission is scheduled in at least one of the first plurality of consecutive uplink slots or the second plurality of consecutive uplink slots, on the first component carrier or on the second component carrier in the common slot or means for determining, based at least in part on determining that no uplink transmission is scheduled in at least one of the first plurality of consecutive uplink slots or the second plurality of consecutive uplink slots, whether to switch a transmit chain of the UE between the first component carrier and the second component carrier in the common slot, and/or the like. The aforementioned means may be one or more of the aforementioned modules of the apparatus 602 and/or the processing system 702 of the apparatus 602' configured to perform the functions recited by the aforementioned means. As described elsewhere herein, the processing system 702 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 7 is provided as an example. Other examples may differ from what is described in connection with FIG. 7.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   grouping, into a common slot, a plurality of first uplink slots included in a first component carrier and a plurality of second uplink slots included in a second component carrier,
      wherein at least a subset of the plurality of first uplink slots and at least a subset of the first plurality of second uplink slots overlap; and
   transmitting, based at least in part on an uplink transmission that is scheduled in at least one of the plurality of first uplink slots or the plurality of second uplink slots, on the first component carrier or on the second component carrier in the common slot, or
   switching, when no uplink transmission is scheduled in at least one of the plurality of first uplink slots or the plurality of second uplink slots, a transmit chain of the UE between the first component carrier and the second component carrier in the common slot prior to a transmission and based at least in part on receiving scheduling signaling, or
   refraining from switching, when no uplink transmission is scheduled in at least one of the plurality of first uplink slots or the plurality of second uplink slots, a transmit chain of the UE between the first component carrier and the second component carrier in the common slot based at least in part on not receiving scheduling signaling.

2. The method of claim 1, wherein an indication that a collision occurs for the UE in the common slot is based on:
   a first uplink transmission is being scheduled in at least a subset of the plurality of first uplink slots; and
   a second uplink transmission being scheduled in at least a subset of the plurality of second uplink slots.

3. The method of claim 2, wherein transmitting on the first component carrier or on the second component carrier in the common slot comprises:
   transmitting, based on the collision and based on a first priority associated with the first component carrier and a second priority associated with the second component carrier, the first uplink transmission on the first component carrier in the common slot or the second uplink transmission on the second component carrier in the common slot.

4. The method of claim 3, further comprising:
   switching the transmit chain of the UE to a default component carrier after transmitting the first uplink transmission or the second uplink transmission.

5. The method of claim 3, wherein transmitting on the first component carrier or on the second component carrier in the common slot comprises:
   transmitting the first uplink transmission on the first component carrier in the common slot based on the first priority being greater relative to the second priority.

6. The method of claim 5,
   wherein the first priority is greater relative to the second priority based on at least one of:
      the first component carrier being associated with a primary cell of the UE,
      the first component carrier being a lower frequency relative to the second component carrier, or
      receiving, from a base station (BS), an indication of the first priority and the second priority.

7. The method of claim 2,
   wherein an error occurs based on the collision, and wherein transmitting on the first component carrier or on the second component carrier in the common slot comprises:
      refraining, based on the error, from transmitting on the first component carrier or on the second component carrier in the common slot,
      transmitting, based on the error, the first uplink transmission on the first component carrier in the common slot or transmitting the second uplink transmission on the second component carrier in the common slot, or
      transmitting, based on the error, the first uplink transmission on the first component carrier in the common slot based on the first component carrier being associated with a primary cell of the UE.

8. The method of claim 2, further comprising:
switching, based on the collision, the transmit chain of the UE between the first component carrier and the second component carrier in a first slot that occurs after a permitted carrier switching boundary.

9. The method of claim 2, further comprising:
switching, based on the collision, the transmit chain of the UE between the first component carrier and the second component carrier in a first slot that occurs after a permitted carrier switching boundary and after one or more other slots for which scheduling signaling was received at a same time as or before scheduling signaling was received for the first slot.

10. The method of claim 2, further comprising:
switching, based on the collision, the transmit chain of the UE between the first component carrier and the second component carrier before or after any slot boundary of the common slot.

11. A user equipment (UE), comprising:
one or more transceivers;
one or more memories comprising instructions; and
one or more processors configured to execute the instructions and cause the UE to:
  group, into a common slot, a plurality of first uplink slots included in a first component carrier and a plurality of second uplink slots included in a second component carrier,
    wherein at least a subset of the plurality of first uplink slots and at least a subset of the plurality of second first uplink slots overlap; and
  transmit, via the one or more transceivers, based at least in part on an uplink transmission that is scheduled in at least one of the plurality of first uplink slots or the plurality of second uplink slots, on the first component carrier or on the second component carrier in the common slot, or
  switch, when no uplink transmission is scheduled in at least one of the plurality of first uplink slots or the plurality of second uplink slots, a transmit chain of the UE between the first component carrier and the second component carrier in the common slot prior to a transmission and based on receiving scheduling signaling, or
  refrain from switching, when no uplink transmission is scheduled in at least one of the plurality of first uplink slots or the plurality of second uplink slots, a transmit chain of the UE between the first component carrier and the second component carrier in the common slot based on not receiving scheduling signaling.

12. The UE of claim 11, wherein an indication that a collision occurs for the UE in the common slot is based on:
a first uplink transmission that is scheduled in at least a subset of plurality of first uplink slots; and
a second uplink transmission that is scheduled in at least a subset of plurality of the second uplink slots.

13. The UE of claim 12, wherein the one or more processors, when transmitting on the first component carrier or on the second component carrier in the common slot, are configured to cause the UE to:
transmit, via the one or more transceivers, based on the collision, and based on a first priority associated with the first component carrier and a second priority associated with the second component carrier, the first uplink transmission on the first component carrier in the common slot or the second uplink transmission on the second component carrier in the common slot.

14. The UE of claim 13, wherein the one or more processors are further configured to cause the UE to:
switch the transmit chain of the UE to a default component carrier after transmitting the first uplink transmission or the second uplink transmission.

15. The UE of claim 13, wherein the one or more processors, when transmitting on the first component carrier or on the second component carrier in the common slot, are configured to cause the UE to:
transmit, via the one or more transceivers, the first uplink transmission on the first component carrier in the common slot based on the first priority being greater relative to the second priority.

16. The UE of claim 15, wherein
the first priority is greater relative to the second priority based on at least one of:
  the first component carrier being associated with a primary cell of the UE,
  the first component carrier being a lower frequency relative to the second component carrier, or
  a received indication of the first priority and the second priority.

17. The UE of claim 12, wherein
an error occurs based on the collision, and wherein the one or more processors, when transmitting on the first component carrier or on the second component carrier in the common slot, are configured to cause the UE to:
  refrain, based the error, from transmitting on the first component carrier or on the second component carrier in the common slot,
  transmit, via the one or more transceivers and based the error, the first uplink transmission on the first component carrier in the common slot or transmitting the second uplink transmission on the second component carrier in the common slot, or
  transmit, via the one or more transceivers and based on the error, the first uplink transmission on the first component carrier in the common slot based on the first component carrier being associated with a primary cell of the UE.

18. The UE of claim 12, wherein the one or more processors are further configured to cause the UE to:
switch, based on the collision, the transmit chain of the UE between the first component carrier and the second component carrier in a first slot that occurs after a permitted carrier switching boundary.

19. The UE of claim 12, wherein the one or more processors are further configured to cause the UE to:
switch, based on the collision, the transmit chain of the UE between the first component carrier and the second component carrier in a first slot that occurs after a permitted carrier switching boundary and after one or more other slots for which scheduling signaling was received at a same time as scheduling signaling was received for the first slot.

20. The UE of claim 12, wherein the one or more processors are further configured to cause the UE to:
switch, based on the collision, the transmit chain of the UE between the first component carrier and the second component carrier before or after any slot boundary of the common slot.

21. The UE of claim 11, wherein:
an uplink transmission is scheduled in at least a subset of the plurality of first uplink slots,
no scheduling signaling has been received for the plurality of second uplink slots, and wherein the one or more processors, when transmitting on the first component carrier or on the second component carrier in the common slot, are configured to cause the UE to:
  transmit, via the one or more transceivers, the uplink transmission on the first component carrier in the common slot based on determining that no scheduling signaling being received for the plurality of second uplink slots.

22. The UE of claim 21, wherein an indication that no scheduling signaling has been received for the one or more second uplink slots is based on:
  a search of downlink control information (DCI) associated with the plurality of second uplink slots for scheduling signaling; and
  a search, after searching the DCI associated with the plurality of second uplink slots, of a radio resource control configuration associated with the second uplink slots for scheduling signaling.

23. The UE of claim 21, wherein an indication that no scheduling signaling has been received for the one or more second uplink slots is based on:
  a search of a radio resource control (RRC) configuration associated with the second uplink slots for scheduling signaling; and
  a search, after searching the RRC configuration associated with the plurality of second uplink slots, of downlink control information associated with the plurality of second uplink slots for scheduling signaling.

24. The UE of claim 11, wherein the one or more processors, when refraining from switching the transmit chain of the UE between the first component carrier and the second component carrier in the common slot, are configured to cause the UE to:
  refrain from switching the transmit chain of the UE between the first component carrier and the second component carrier in the common slot until receiving a scheduling communication that causes the UE to switch the transmit chain of the UE between the first component carrier and the second component carrier,
  switch to the first component carrier in the common slot based on the first component carrier being a default component carrier of the UE,
  switch to the first component carrier in the common slot based on the first component carrier being associated with a primary cell of the UE, or
  switch to the first component carrier in the common slot based on the first component carrier being a lower frequency relative to the second component carrier.

25. The UE of claim 11, wherein the first component carrier is included in a first component carrier group; and
  wherein the second component carrier is included in a second component carrier group.

26. The UE of claim 25, wherein simultaneous uplink transmissions are not permitted across component carriers in the first component carrier group; and
  wherein simultaneous uplink transmissions are not permitted across component carriers in the second component carrier group.

27. The UE of claim 25, wherein the one or more processors are further configured to cause the UE to:
  receive scheduling signaling from a primary cell in the first component carrier group; and
  receive scheduling signaling from a primary cell in the second component carrier group.

28. The UE of claim 11, wherein the first component carrier is a time division multiplexed component carrier that supports two or more transmit ports; and
  wherein the first component carrier supports switching between consecutive uplink slots or within uplink slots.

29. A non-transitory computer-readable medium storing one or more instructions for wireless communication, the one or more instructions comprising:
  one or more instructions that, when executed by one or more processors of a user equipment (UE), cause the one or more processors to:
    group, into a common slot, a plurality of first uplink slots included in a first component carrier and a plurality of second uplink slots included in a second component carrier,
      wherein at least a subset of the plurality of first uplink slots and at least a subset of the plurality of second first uplink slots overlap; and
    transmit, based at least in part on an uplink transmission that is scheduled in at least one of the plurality of first uplink slots or the plurality of second uplink slots, on the first component carrier or on the second component carrier in the common slot, or
    switch, when no uplink transmission is scheduled in at least one of the plurality of first uplink slots or the plurality of second uplink slots, a transmit chain of the UE between the first component carrier and the second component carrier in the common slot prior to a transmission and based on receiving scheduling signaling, or
    refrain from switching, when no uplink transmission is scheduled in at least one of the plurality of first uplink slots or the plurality of second uplink slots, a transmit chain of the UE between the first component carrier and the second component carrier in the common slot based on not receiving scheduling signaling.

30. The non-transitory computer-readable medium of claim 29, wherein an indication that a collision occurs for the UE in the common slot is based on:
  a first uplink transmission that is scheduled in at least a subset of the plurality of first uplink slots; and
  a second uplink transmission that is scheduled in at least a subset of plurality of the second uplink slots.

31. The non-transitory computer-readable medium of claim 30, wherein the one or more instructions, that cause the one or more processors to transmit on the first component carrier or on the second component carrier in the common slot, cause the one or more processors to:
  transmit, based on the collision and based on a first priority associated with the first component carrier and a second priority associated with the second component carrier, the first uplink transmission on the first component carrier in the common slot or the second uplink transmission on the second component carrier in the common slot.

32. The non-transitory computer-readable medium of claim 31, wherein the one or more instructions, when executed by the one or more processors, further cause the one or more processors to:
  switch the transmit chain of the UE to a default component carrier after transmitting the first uplink transmission or the second uplink transmission.

33. A user equipment (UE) for wireless communication, comprising:
- means for grouping, into a common slot, a plurality of first uplink slots included in a first component carrier and a plurality of second uplink slots included in a second component carrier,
  - wherein at least a subset of the plurality of first uplink slots and at least a subset of the plurality of second first uplink slots overlap; and
- means for transmitting, based at least in part on an uplink transmission that is scheduled in at least one of the plurality of first uplink slots or the plurality of second uplink slots, on the first component carrier or on the second component carrier in the common slot, or
- means for switching, when no uplink transmission is scheduled in at least one of the plurality of first uplink slots or the plurality of second uplink slots, a transmit chain of the UE between the first component carrier and the second component carrier in the common slot prior to a transmission and based at least in part on receiving scheduling signaling, or
- means for refraining from switching, when no uplink transmission is scheduled in at least one of the plurality of first uplink slots or the plurality of second uplink slots, a transmit chain of the UE between the first component carrier and the second component carrier in the common slot based at least in part on not receiving scheduling signaling.

34. The UE of claim 33, wherein an indication that a collision occurs for the UE in the common slot is based on:
- a first uplink transmission that is scheduled in at least a subset of the plurality of first uplink slots; and
- a second uplink transmission that is scheduled in at least a subset of the plurality of second uplink slots.

35. The UE of claim 34, wherein the means for transmitting on the first component carrier or on the second component carrier in the common slot comprises:
- means for transmitting, based on the collision and based on a first priority associated with the first component carrier and a second priority associated with the second component carrier, the first uplink transmission on the first component carrier in the common slot or the second uplink transmission on the second component carrier in the common slot.

* * * * *